May 31, 1932. O. C. BERRY 1,861,045
COMBUSTION CHAMBER FOR INTERNAL COMBUSTION ENGINES
Filed April 26, 1930
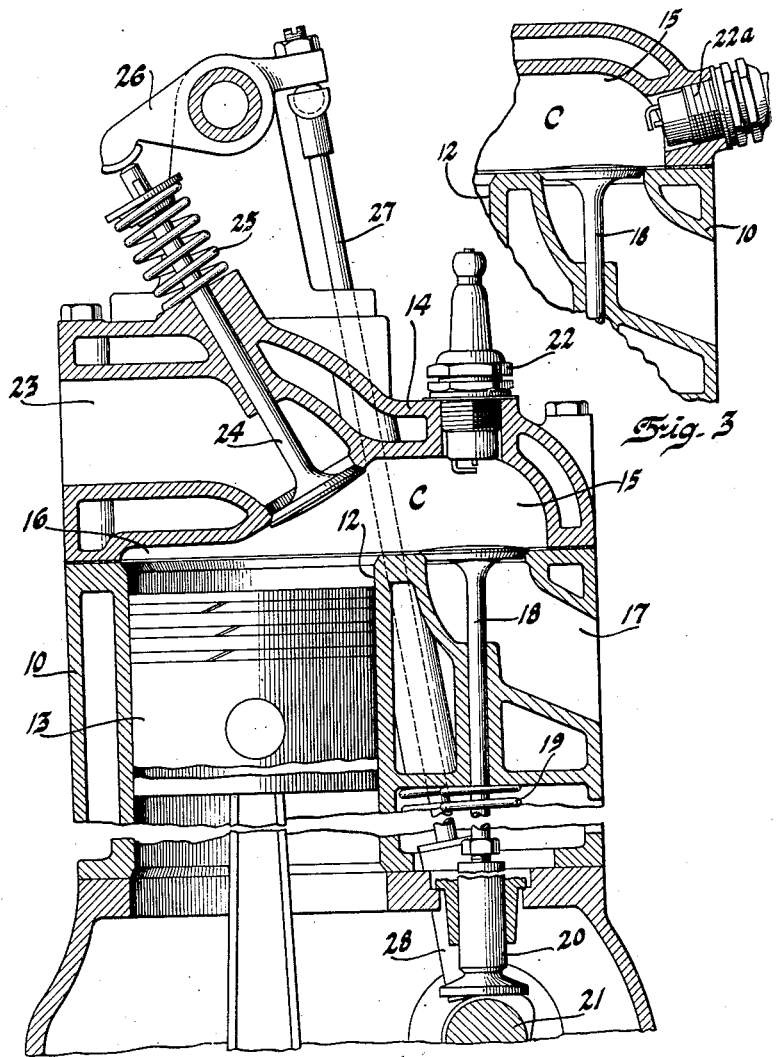
Fig. 3
Fig. 1
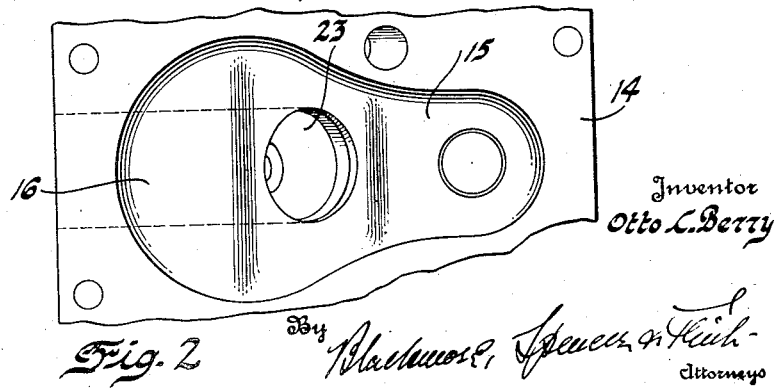
Fig. 2
Inventor
Otto C. Berry
By
Attorneys Patented May 31, 1932

1,861,045

UNITED STATES PATENT OFFICE

OTTO CARTER BERRY, OF FLINT, MICHIGAN, ASSIGNOR TO GENERAL MOTORS CORPORATION, OF DETROIT, MICHIGAN, A CORPORATION OF DELAWARE

COMBUSTION CHAMBER FOR INTERNAL COMBUSTION ENGINES

Application filed April 26, 1930. Serial No. 447,602.

This invention relates to combustion chambers for internal combustion engines having reciprocating pistons; and more particularly to engines wherein the combustion space lies over and also extends to one side of the cylinder bore.

The modern highly developed automobile engine is characteristically unsteady at idle. Its combustion chambers have been developed for powerful explosions; and the mechanical efficiency of the engine is so high that it is hard to produce regular explosions weak enough to do nothing more than keep it turning over slowly. The suction in the intake manifold, particularly of multi-cylinder engines, is often more than 19 inches of mercury at idle. At the end of the exhaust stroke of a piston the combustion chamber of the corresponding cylinder is filled with burned gas at more than atmospheric pressure. When the intake valve opens, the burned gas rushes into the intake manifold. As the piston descends this burned gas is drawn back first, together with a following small amount of new combustible mixture. Only the very end of the suction stroke draws in a pure combustible charge. If at the end of the compression stroke this small volume of new combustible mixture is concentrated around the spark plug or other ignition device, ignition is certain even though the combustible charge be an extremely small one. If the new combustible charge is mixed with the burned gases, or worse still, concentrated at a point away from the ignition device, it will not be possible to fire a weak charge with certainty, and the idle will not be "solid". One object of this invention is, therefore, to arrange the combustion chamber so that the last of intake charge to be drawn in will be pocketed and compressed right around the ignition points of the spark plug or other ignition device.

In a well designed and properly timed electric ignition engine, the spark passes and the burning of the charge is completed while the piston is within a small fraction of an inch of the top of its stroke. If the combustion chamber is wide and flat the flame cap or front has a long way to go and the result is inferior power. If the combustion chamber is compact the burning is completed in less time and better power results. A second object of this invention is, therefore, to produce a compact combustion chamber.

The exhaust valve heads become very hot when the engine runs at high speeds. The wonderful alloys now used in the valves will stand the high temperatures, but when the valves rest on their cast-iron seats, they heat the very top layer of iron hotter than it can stand. The result is that the exhaust valves eat into their seats. This is a common fault in the best automobile engines of today. I have found that it requires only a small reduction in the maximum temperature reached by the exhaust valve heads to cure this trouble. I therefore place the exhaust valve head directly in the path of the cool intake charge moving toward the cylinder, and thus lower its temperature to a marked degree and completely prevent the valves from eating into their seats. This is the third object of my invention.

Referring to the accompanying drawings which illustrate exemplary embodiments of the invention. Fig. 1 is a transverse section thru a cylinder block and head on a plane parallel with the cylinder axis; Fig. 2 is an underside plane view of the combustion chamber cavity in the head shown in section in Fig. 1, and Fig. 3 is a fragmentary sectional view showing a different position of the spark plug.

Referring to Fig. 1, 10 indicates a cylinder block which is provided with a cylinder bore 12, suitable passages for the circulation of cooling fluid, and other features characteristic of cylinder blocks. Within the bore 12 a piston 13 is adapted to reciprocate. The upper end of the cylinder bore 12 communicates with a chamber $c$ formed in a head 14 shown as detachable from the block 10 although it may, of course, be integral with the block. The chamber $c$ extends over the cylinder bore 12 and is offset to one side thereof, as at 15, the offset portion being of relatively great depth and compactness compared with that portion 16 at the opposite side thereof over the piston which is of relatively wide expanse but of shallower depth when the piston is at the end of its compression stroke. In horizontal section the chamber is pear shaped as illustrated in Fig. 2.

The roof of the combustion chamber slopes from the roof of the offset portion of greater depth to the roof of portion of lesser depth as shown in Fig. 1. An intake valve port 17 opens into the offset portion 15 of the chamber thru the floor thereof. The diameter of this port is not much less than the width of the offset portion. Said port is controlled by an intake valve 18 normally held closed by spring 19 and opened by cooperation of the tappet 20 with the cam shaft 21. An ignition device such as a spark plug 22 is disposed in the offset portion of the chamber near the intake port, where the intake valve ignition points will be submerged in the last portion of the fresh charge to be drawn into the chamber.

The outlet or exhaust port 23 communicates with the chamber c thru the inclined portion of the roof before referred to. The port 23 is controlled by an exhaust valve 24 normally closed by the spring 25 and opened by the rocker arm 26 which is connected by means of an operating rod 27, which may be inclined as shown, to a tappet 28 also actuated by the cam shaft 21.

Fig. 3 illustrates a favorable position of the ignition device 22a, close to the intake port, in order that during idling, the ignition points will be submerged in undiluted combustible mixture at time of firing.

The position of the ignition points may be varied so long as they are not removed from a location adjacent the intake valve where they will be surrounded by unburned mixture after the charge has been compressed.

In the embodiment shown the intake ports open on one side and the exhaust ports on the other side of the engine block. This arrangement is, of course, not essential, but it is the one preferred.

In operation, intake valve 18 is opened during the intake stroke of the piston 13. Cool mixture flows into the chamber 15 and continuously impinges upon and moves past the electrodes of the spark plug 22 pushing away any residual burnt gas which may have lingered in the neighborhood of the electrodes although the latter are well removed from the exhaust port. The incoming cool mixture after flowing past the electrodes impinges upon the heated exhaust valve and tends to cool it. Near the end of the compression stroke of the piston, after the locality of the ignition electrodes has been swept free of burnt gases, the ignition spark occurs. Combustion readily ensues driving the piston downward on its power stroke. On the scavenging stroke the exhaust valve opens and the burnt gases are forced out thru the passage 23.

The form of combustion chamber, the relative location of the intake and exhaust valves, and the position of the sparking points most favorable to ignition of the charge, particularly during idling, are important features of this invention.

Although the engine has been described as if it occupied the usual upright position of engines of the type illustrated it may assume any position in space.

I claim:

1. In an internal combustion engine comprising a cylinder block having a cylinder bore and a piston therein; a cylinder head forming, with the cylinder block, a combustion chamber extending over and offset to one side of the cylinder bore, the offset portion of the chamber having greater depth than the portion over the bore when the piston is at the end of its compression stroke, the roof of said chamber slanting from the roof over the offset portion to the roof of the portion over the bore, said chamber having a mixture inlet in the offset portion; an ignition device in said offset portion and an outlet for burnt gas in the sloping portion of the roof.

2. In an internal combustion engine the combination as defined in claim 1, said offset portion of the chamber having less width than the portion over the bore.

3. In an internal combustion engine as defined in claim 1, said mixture inlet being in the floor of the offset portion of the chamber.

4. In an internal combustion engine the combination defined in claim 1 with a valve for controlling the fuel mixture inlet, a valve for controlling the burnt gas outlet, said valve controlling the outlet having a stem normal to the inclined portion of the chamber roof, a single cam shaft and mechanical connections between said cam shaft and said valves for operating them in proper time relation.

5. In an internal combustion engine the combination defined in claim 1, with a spring closed valve for controlling the inlet, a spring closed valve for controlling the outlet, said outlet controlling valve having a stem normal to the inclined portion of the chamber roof, a rocker arm for opening said outlet controlling valve, a valve operating shaft, an inclined rod extending from the valve operating shaft to said rocker arm, and an operating connection between said shaft and said valve for controlling the inlet.

6. In an internal combustion engine comprising a cylinder block having a cylinder bore and a piston therein; a cylinder head forming with the cylinder block a combustion chamber extending over and offset to one side of the cylinder bore; the offset portion of the chamber having greater depth and less width than the diametrically opposite portion lying over the cylinder bore when the piston is at the end of its compression stroke; said chamber having a valve controlled inlet port in the floor of the offset portion, a valve controlled exhaust port in the roof of said chamber substantially at the junction between the portions of greater and lesser depth, and an ignition device within the offset portion adjacent the intake port.

In testimony whereof I affix my signature.

OTTO CARTER BERRY.